(No Model.) 2 Sheets—Sheet 1.
S. WALKER.
MIRROR ATTACHMENT FOR THEATER CHAIRS.
No. 588,845. Patented Aug. 24, 1897.
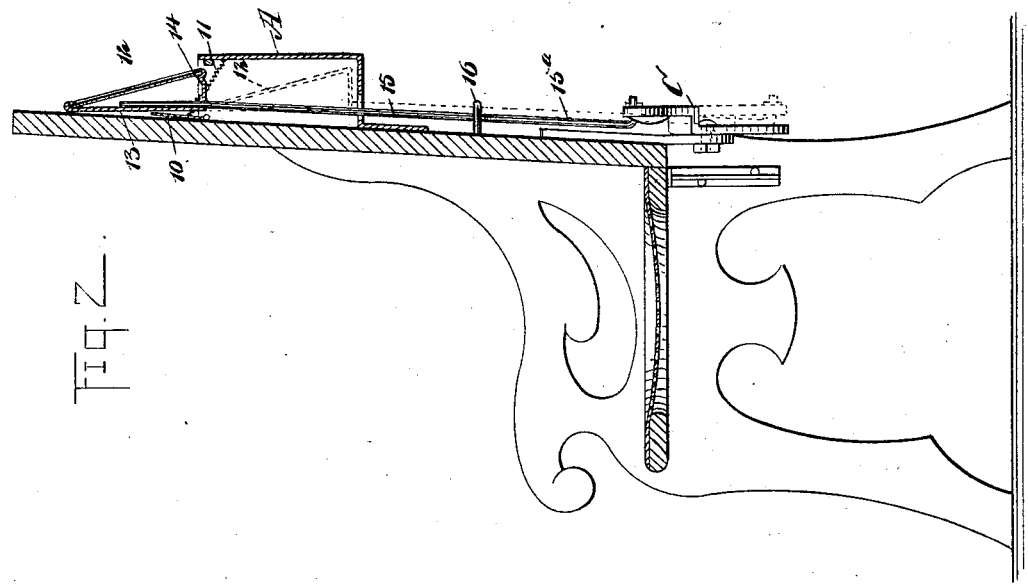
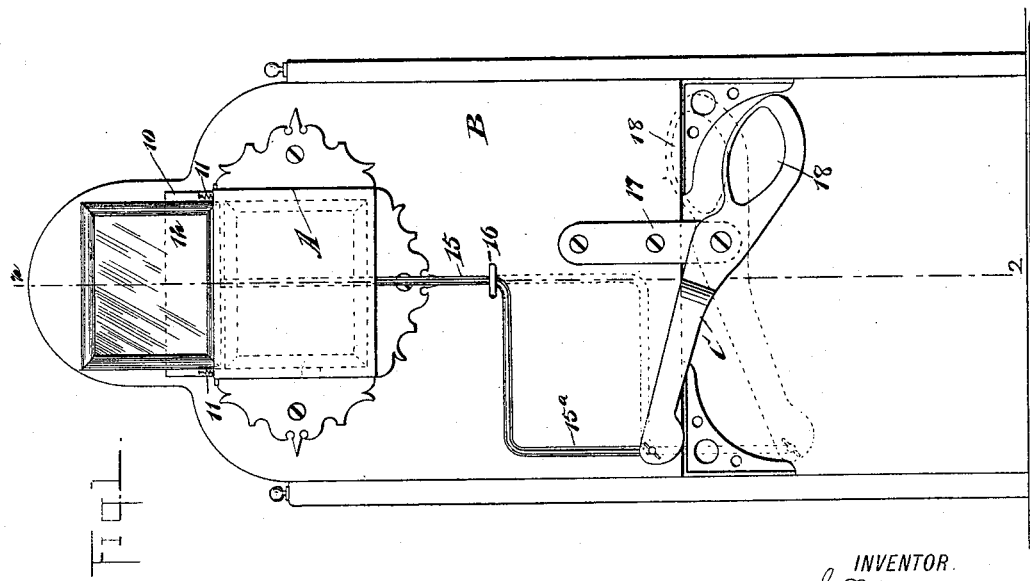
WITNESSES:
H. Hellyer.
INVENTOR.
S. Walker
BY
ATTORNEYS.

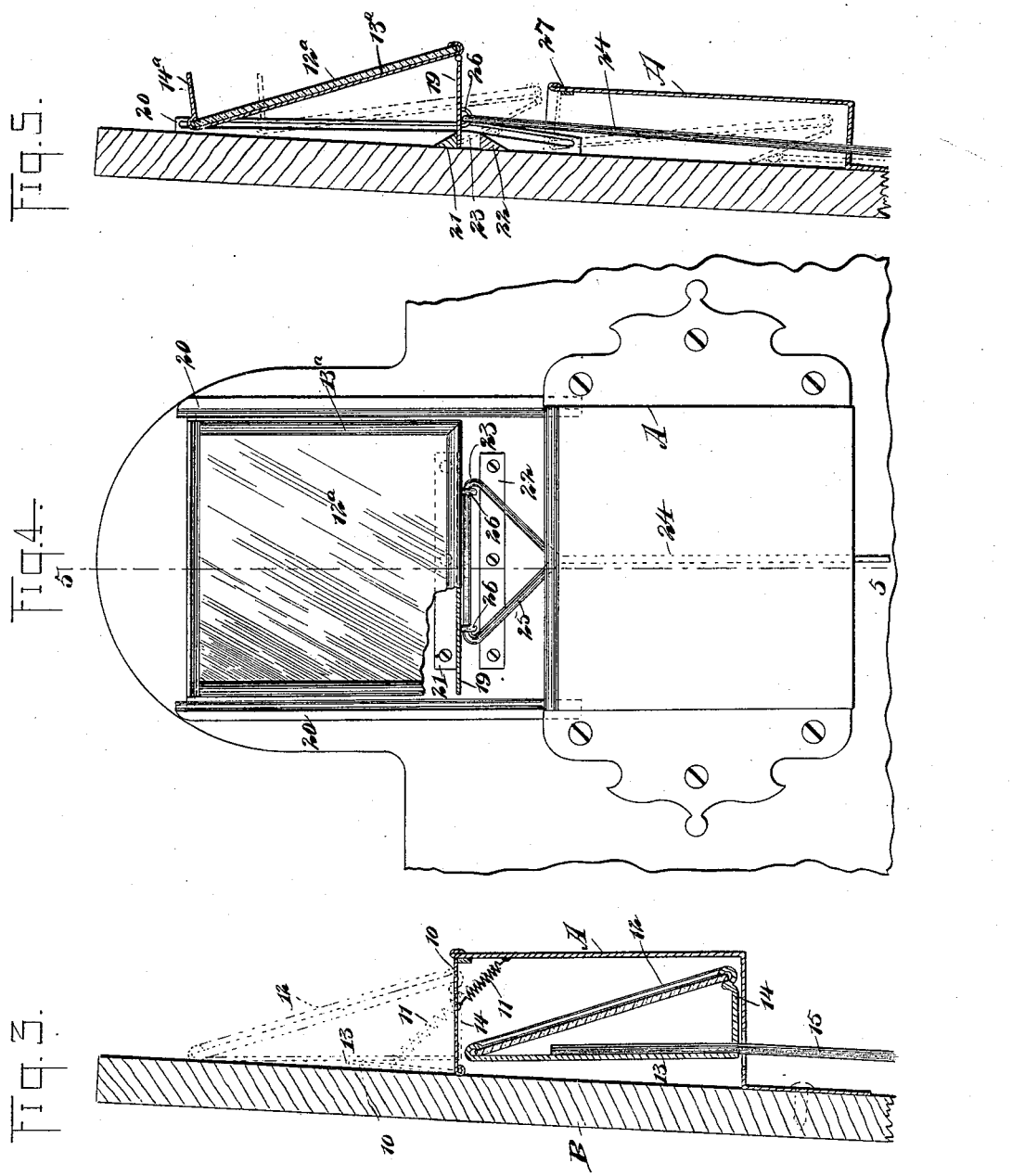

UNITED STATES PATENT OFFICE.

SAMUEL WALKER, OF BROOKLYN, NEW YORK.

MIRROR ATTACHMENT FOR THEATER-CHAIRS.

SPECIFICATION forming part of Letters Patent No. 588,845, dated August 24, 1897.

Application filed July 3, 1896. Serial No. 597,964. (No model.)

*To all whom it may concern:*

Be it known that I, SAMUEL WALKER, of Brooklyn, in the county of Kings and State of New York, have invented a new and Improved Mirror Attachment for Theater-Chairs, of which the following is a full, clear, and exact description.

The object of my invention is to provide a mirror attachment for theater-chairs, but which is also adapted for use in connection with any support of an upright or approximately upright character, which mirror will be automatic in various of its movements.

A further object of the invention is to provide an adjustable and movable mirror, together with a fixed housing or casing therefor, in which casing the mirror will be normally concealed and protected, and to construct a shifting device capable of being operated by the foot of a person in such manner as to slide the mirror out from its casing and hold it in an exposed position for any desired period of time, leaving the hands of the operator entirely free.

A further object of the invention is to so construct the mirror that a person seated, for example, facing the mirror may have a perfect view of the face, head, and upper portion of the body without elevating the mirror above the top of the chair to which it is applied, thereby not interfering with the view over the chair from the front, back, or from any side.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a rear elevation of a theater-chair having the mirror attachment applied and illustrating the mirror as exposed and in its upper position. Fig. 2 is a vertical section through the chair and the mirror attachment, the section being taken practically on the line 2 2 of Fig. 1. Fig. 3 is a vertical section through the upper portion of the chair-back and likewise a vertical section through the mirror and its casing or housing, the mirror being shown within the said housing. Fig. 4 is a rear elevation of the upper portion of the chair-back, on a larger scale than in the other views, illustrating the mirror attachment in a slightly-modified form, the mirror being raised from its casing or housing and parts of the mirror being broken away; and Fig. 5 is a vertical section taken substantially on the line 5 5 of Fig. 4.

In carrying out the invention the box-like casing or housing A, which may be of any ornamental character, if desired, is secured in any suitable or approved manner upon the back of the chair B or other support at a point near the top of the said chair-back, and the housing or casing is normally closed by a cover 10, which is shown hinged to the back of the chair, and the said cover is held in its closed position by springs 11 or their equivalents or other tension devices placed ordinarily at or near their ends, as illustrated; but if in practice it is found desirable instead of the cover being in one piece it may be made in two or more pieces, and the character of the cover may be otherwise changed, or the said cover may be entirely omitted, although it is preferably employed in order to prevent persons tampering with the mirror 12, which is normally contained within the casing or housing.

The mirror 12 is located in a frame, which preferably consists of a vertical back member 13 and a horizontal bottom member 14, and the mirror rests upon the bottom of the frame near its outer or free edge, and at the top the mirror has bearing against the upper portion of the back member or section 13 of the frame, as is shown particularly in Fig. 3. The mirror is therefore at an angle to the chair-back, inclining from the top of its frame downward and outward, and the frame and its mirror in cross-section are substantially of a wedge shape.

A shifting rod 15 is passed loosely through an opening in the bottom of the casing or housing A and is secured in any suitable or approved manner to the frame carrying the mirror, the attachment being usually made to the rear or upright member of the frame, as shown in Figs. 2 and 3. This shifting rod is carried downward to a point near the lower edge of the chair-back through a suitable guide 16, and below the said guide the said shifting rod is preferably provided with a crank-arm 15ª, and to the lower end of this crank-arm one extremity of a foot treadle or lever C is pivotally secured, and this lever or treadle is fulcrumed between its ends upon a bracket or hanger 17 or other projection from the bottom portion of the back of the chair, as shown best in Fig. 1. The free end of the lever has an oblong opening 18 made therein to receive the foot of the operator, and the end of the lever which is attached to the shifting rod is weighted or is of sufficient weight to carry the mirror when elevated downward into the casing or housing when the foot of the operator is removed from the lever or treadle or when the operator permits the attached end of the lever or treadle to descend.

The mirror is raised by introducing the toe of the foot into the oblong opening 18 of the treadle or lever C and pressing downward upon the end containing the said opening, whereupon the opposite end of the lever or treadle will be raised, as shown in Fig. 1, and the mirror will be carried upward, forcing the cover 10 open as it passes out from the casing or housing A, and when the mirror is in its extreme upper position its lower edge need be only slightly above the upper edge of the casing.

It is obvious that the loop formed by the opening 18 will prevent the foot from slipping off the treadle when the mirror is to be raised, as it may happen that the treadle will have to be pressed by the foot to such a slanting position that the foot would be liable to slip off if not provided against, as shown in the drawings, and the oblong form of the opening into which the foot is to be introduced permits of the foot following the inclination of the treadle without inconvenience to the operator, and the mirror may be held in its upper position for any desired length of time without wearying the operator.

By giving the mirror the angle shown in the drawings and above described a person at the back of the chair and facing the mirror can readily see the face without raising the said mirror to a greater height than that of the ordinary theater-chair back, and therefore the mirror is in no manner an obstruction. The preferred form of the mirror in its entirety is that of a wedge or triangle with the apex at the top. The casing or housing A effectually protects the mirror, and the mirror will readily drop therein the moment that the end of the treadle connected with the mirror is permitted to descend.

In Figs. 4 and 5 I have shown a slight modification in the construction of the mirror. The mirror 12ª under this form is provided with an ordinary backing or frame 13ª, provided at the top with an outwardly-extending lip 14ª, which is at an angle to the frame, and a plate 19 is hinged to the bottom of the mirror-frame at the back of the same. At the upper end of the mirror-frame pins are projected horizontally, and the said pins enter slots in guides 20, which are secured to the back of the chair and are carried downward within the housing or casing A, as is particularly shown in Fig. 5. Above the housing or casing A two battens 21 and 22 are secured transversely on the back of the chair, a space 23 intervening between the said battens. The opposing faces of the battens are straight, and their outer faces are inclined transversely in opposite directions, the inclination of the upper batten being in an upward direction and the inclination of the lower batten in a downward direction or in direction of the said casing A. The shifting rod 24, employed under this construction, likewise passes loosely through the bottom of the casing, being attached to the treadle C in the manner hereinbefore described; but the upper end of the shifting rod is given a triangular shape, and the upper end of this triangular head 25 is passed loosely through staples 26 or their equivalents secured to the under face of the plate 19, that is hinged to the mirror, and said staples are located between the transverse center of the said plate and the rear or free edge of the same.

In the operation of this form of mirror when the mirror is in the casing A, as shown in dotted lines in Fig. 5, the plate 19 will be folded up back of the mirror, and the lip 14ª will rest upon an offset 27, located upon the inner face of the casing, the said lip constituting a cover for the same. When the mirror is to be raised, the free end of the treadle is pressed downward, as heretofore stated, whereupon the mirror is carried upward, sliding at its upper end in the guides 20, and when the hinged plate 19 has entered the space between the two battens 21 and 22 and engaged with the inner face of the upper batten, as shown in positive lines in Fig. 5, the hinge-plate will be in a horizontal position, and the lower end of the mirror will be carried forward or in direction of the operator, while the upper end will be at a point near the back of the seat, and the mirror will have practically the same inclination as when given the predetermined triangular or wedge shape heretofore described. When the mirror is to be lowered, the treadle is released in the same manner as heretofore referred to, and as the mirror is drawn downward the hinge-plate 19 will fold behind the mirror, as shown in dotted lines, and the mirror and plate in this position will enter the casing. By thus attaching a mirror to a theater-chair, protecting the mirror when not in use, and providing a means for carrying the mirror to a position for service great convenience will be afforded persons who may desire to ascertain the set of a garment or a hat or the condition of the hair or face at the end of the evening or when about to leave their seats.

The attachment may be so applied that it will take but very little room, and especially so when the mirror is provided with the hinged stay-plate 19, since the mirror under such construction may fold closely to the seat when not in use, and the casing or housing A may be made quite shallow.

Having thus described my invention, I claim as new and desire to secure by Letters Patent—

1. The combination of a theater-chair, a mirror movable upon the back of said chair into and out of position for use, a treadle and connections between the treadle and mirror whereby the movements of the treadle effect a movement of the mirror, substantially as shown and described.

2. A support, a shield or housing carried by said support, a mirror normally held within the said shield or housing and adapted to be projected above the same, a treadle located below the housing, and a rod extending through the bottom of the said shield or housing and connecting the said treadle and mirror, as and for the purpose specified.

3. A support, a box-like shield or housing connected with said support, a mirror normally held within the said shield or housing and movable vertically above the top thereof, the said mirror having its reflecting-face at an inclination to the support, a pivoted treadle located below the bottom of the said shield or housing, and a rod extending through the bottom of the said shield and connecting the treadle and mirror, as and for the purpose specified.

4. The combination with the back of a theater-chair or like support, of a mirror movable vertically upon the said support, and having its reflecting-surface at an angle to the said support, a treadle located below the said mirror, and a rod connecting the treadle and mirror, as and for the purpose specified.

5. The combination with the back of a theater-chair or like support, of a shield or housing attached to said support, a mirror normally held within said shield and adapted to be moved vertically above said shield, the said mirror having its reflecting-surface at an angle to the said back, a pivoted treadle, and a connection between one end of the said treadle and the mirror, the preponderance of weight of the treadle being at the end connected with the mirror, whereby when the treadle is operated to elevate the mirror above the shield, and is released from pressure the weighted portion of the treadle will automatically lower the mirror within the shield, as and for the purpose specified.

6. The combination with the back of a theater-chair or like support, a shield or housing connected therewith, a mirror located within the said shield, and capable of being moved to a point outside of said shield, and a cover for the shield opened by the upward movement of the mirror, of a pivoted lever located below the said shield and a rod extending within the said shield, and connecting the lever and mirror, as and for the purpose specified.

7. The combination, with a support, a shield connected therewith, and a mirror normally located within the said shield and capable of being carried above the shield, the reflecting-face of the mirror being at an angle to the support, of a treadle carried by the support, having one end heavier than the other, its lighter end being provided with a cavity to receive the foot of the operator, and a connection between the weighted end of the lever and the said mirror, as and for the purpose set forth.

8. The combination, with the back of a theater-chair or like support, a shield attached thereto, a mirror located within the said shield and capable of movement out therefrom, and a cover for the shield opened by the upward movement of the mirror, of a lever located on the support, and a connection between the lever and the mirror, the said lever being arranged to automatically return the mirror within the shield, as and for the purpose specified.

9. The combination, with a support, a shield connected therewith, and a mirror normally located within the shield and capable of being bodily moved to a point without the same, of a foot-lever connected with the said mirror and provided with an oblong opening at one side of its pivot, adapted to receive the toe portion of the operator's foot, whereby the lever may be given a decided inclination without danger of the foot slipping therefrom, as and for the purpose set forth.

10. The combination, with the back of a theater-chair or other support, of a mirror having guided movement on the support at its top, and provided with an extension-brace at its bottom, having a hinged connection therewith, and means, substantially as described, for raising and lowering the said extension-brace, whereby the brace may be folded back of the mirror, or may be straightened out to impart an inclined surface to the said mirror, as and for the purpose set forth.

11. A theater-chair provided upon its back with a mirror movable into and out of position for use, and with a treadle located below said mirror, and a rod connecting the treadle and mirror, substantially as shown and described.

SAMUEL WALKER.

Witnesses:
CHAS. A. ERNST,
B. R. CRYSLER.